Figure 1:
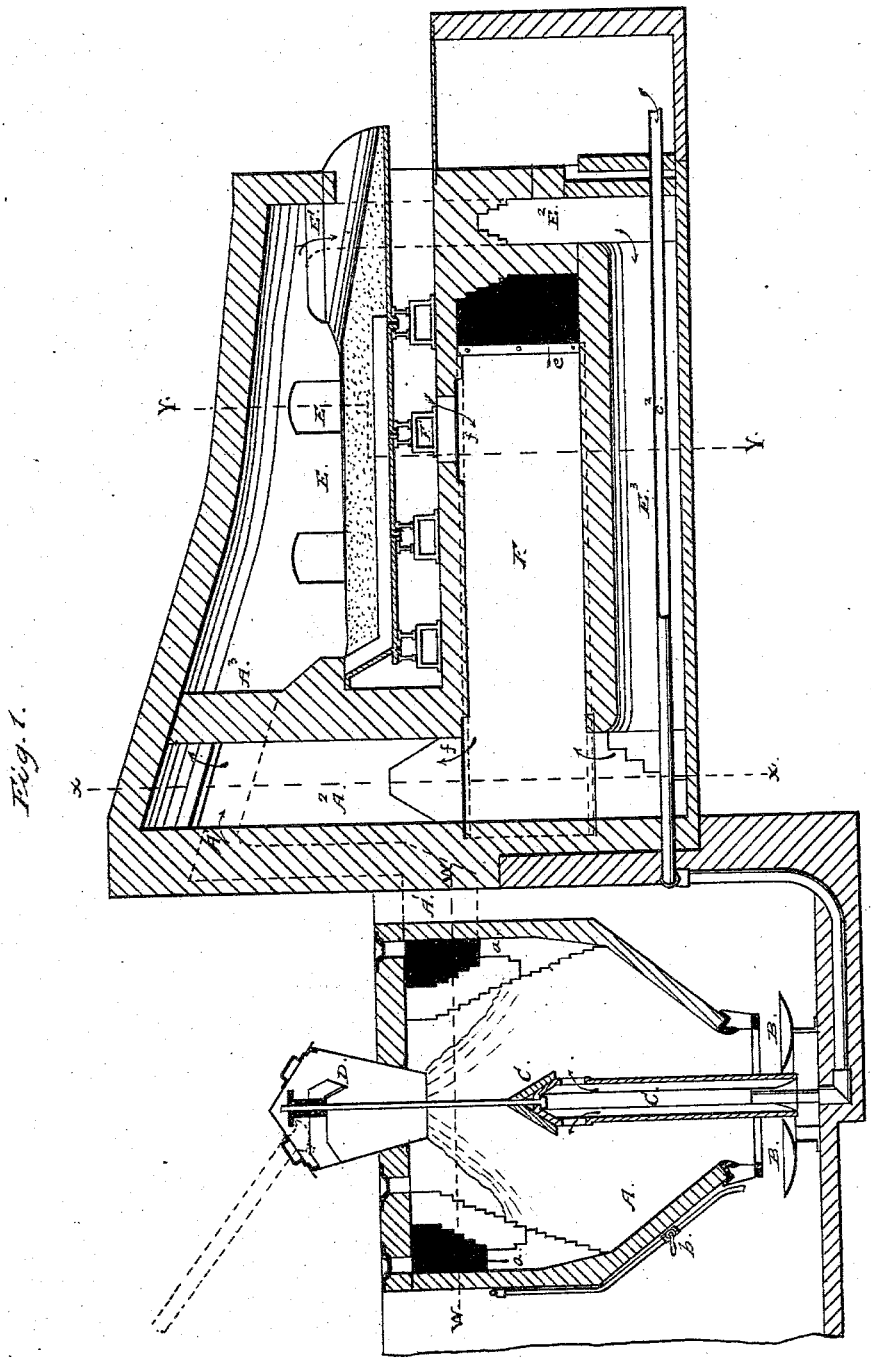

(No Model.)  6 Sheets—Sheet 1.

C. W. SIEMENS.
GAS PRODUCER AND FURNACE OPERATING IN CONNECTION THEREWITH.

No. 288,878. Patented Nov. 20, 1883.

Attest:
F. W. Howard
E. M. Fowler

Inventor,
C. W. Siemens
C. S. Whitman
Atty.

(No Model.) 6 Sheets—Sheet 2.

C. W. SIEMENS.
GAS PRODUCER AND FURNACE OPERATING IN CONNECTION THEREWITH.

No. 288,878. Patented Nov. 20, 1883.

Attest:
F. W. Howard
E. W. Fowler

Inventor:
C. W. Siemens
by C. S. Whitman
Atty (No Model.)
C. W. SIEMENS.
GAS PRODUCER AND FURNACE OPERATING IN CONNECTION THEREWITH
No. 288,878. Patented Nov. 20, 1883.
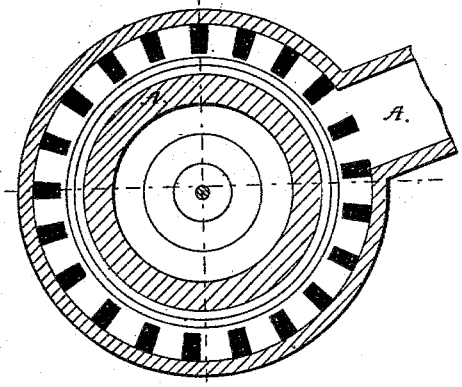
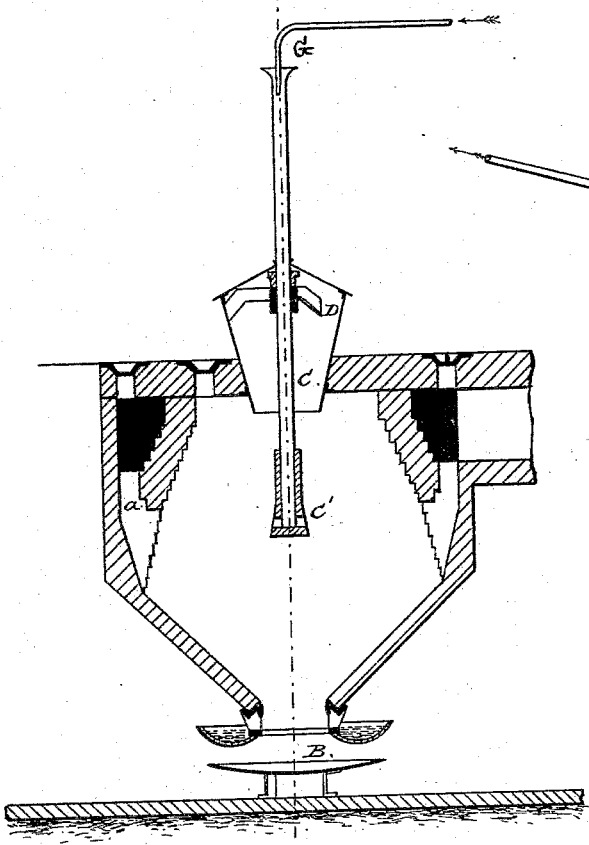
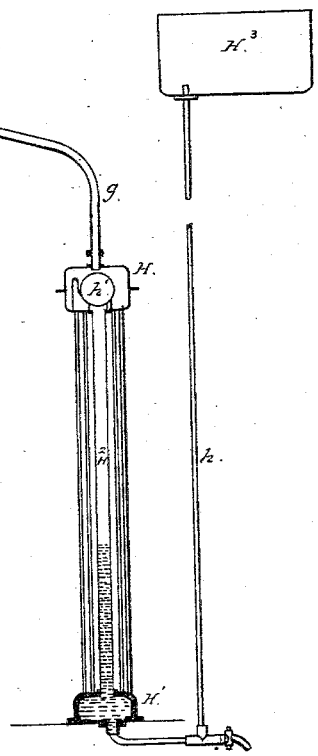

(No Model.)
6 Sheets—Sheet 4.
C. W. SIEMENS.
GAS PRODUCER AND FURNACE OPERATING IN CONNECTION THEREWITH
No. 288,878.
Patented Nov. 20, 1883.
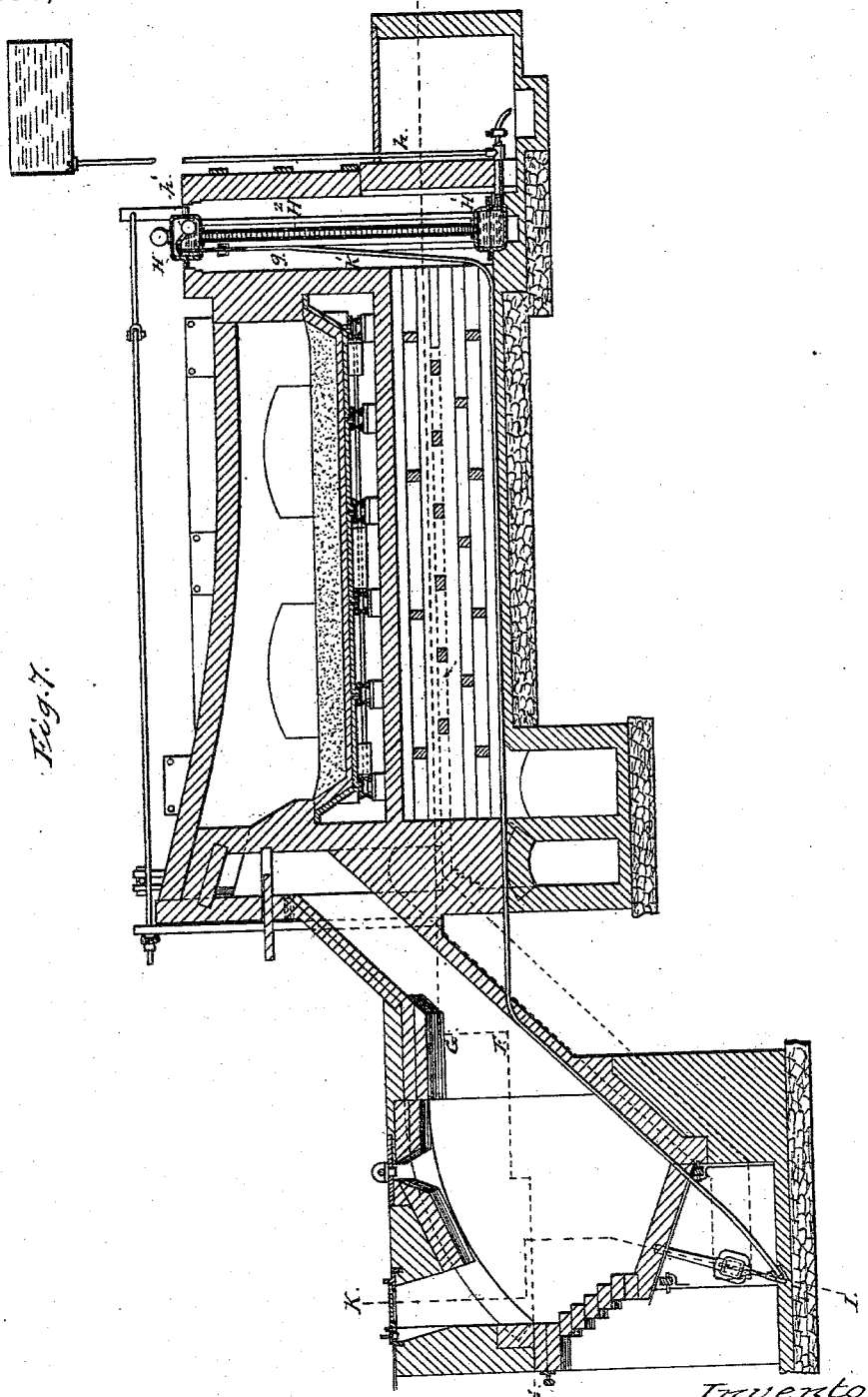
Attest:
H. W. Howard
Edw. H. Downs
Inventor:
C. W. Siemens
by L. S. Whitman
atty (No Model.) C. W. SIEMENS. 6 Sheets—Sheet 5.

GAS PRODUCER AND FURNACE OPERATING IN CONNECTION THEREWITH.

No. 288,878. Patented Nov. 20, 1883.

Attest:
F. W. Howard
Edw. H. Downs

Inventor:
C. W. Siemens
by C. S. Whitman
atty (No Model.)

C. W. SIEMENS.

GAS PRODUCER AND FURNACE OPERATING IN CONNECTION THEREWITH.

No. 288,878. Patented Nov. 20, 1883.

6 Sheets—Sheet 6.

Attest;
F. W. Howard
Edw. H. Downs

Inventor;
C. W. Siemens
by C. S. Whitman
atty.

United States Patent Office.

CHARLES W. SIEMENS, OF WESTMINSTER, COUNTY OF MIDDLESEX, ENGLAND.

GAS-PRODUCER AND FURNACE OPERATING IN CONNECTION THEREWITH.

SPECIFICATION forming part of Letters Patent No. 288,878, dated November 20, 1883.

Application filed August 5, 1882. (No model.) Patented in England August 19, 1880, No. 3,374; in France January 31, 1881, No. 140,857; in Germany February 2, 1881, No. 16,223, and in Belgium February 24, 1881, No. 53,927.

*To all whom it may concern:*

Be it known that I, CHARLES WILLIAM SIEMENS, a subject of the Queen of Great Britain, residing at Westminster, in the county of Middlesex, England, have invented certain new and useful Improvements in Gas-Producers and Furnaces Operating in Connection Therewith; and I do hereby declare the following to be a full, clear, and exact description of the invention, such as will enable others skilled in the art to which it appertains to make and use the same.

My invention relates to gas-producers which may be worked in connection with the furnaces in which the produced gas is utilized for heating purposes, and to furnaces arranged to operate in connection with such producers.

In the producer solid fuel—such as coal, coke, anthracite, lignite, peat, and the like—is acted on by jets of heated air, or of highly-heated air mingled with steam, under the influence of which the fuel is rapidly decomposed, its carbonaceous and hydrogenous constituents forming combustible gases with the constituents of the air and steam, while its earthy ingredients drop in a fused or partly fused condition through openings in the bottom of the producer.

The air for supplping the producer is heated, and the steam may be generated by the heat of the products of combustion passing from the furnace to the chimney, as I will presently describe, and the steam issuing in a jet or jets into a channel supplying the heated air causes the combined jet of heated air and steam, which acts upon the fuel in the producer. The gas is thus produced at a very high temperature, and being comparatively rich in combustible gases—such as hydrogen, marsh-gas, and carbonic oxide—it produces intense heat when it is burned with heated atmospheric air. Gas-regenerators may therefore be dispensed with, the gas being led from the producer directly to the heating-chamber of the furnace, on entering which it meets a current or currents of air previously heated by the products of combustion in their passage from the furnace toward the chimney. This transfer of heat from the products of combustion to the air which supplies both the gas-producer and the furnace is effected by means of a double series of narrow passages separated either by brick walls or by metallic plates placed on edge. A number of these passages are traversed from end to end, or nearly so, by the products of combustion, while each alternate passage is traversed by air, preferably in a direction opposite to that of the products of combustion.

Separate channels may be provided for heating the air supplying the gas-producer, or a portion of the air, heated as above described, may be made to pass through a channel or channels protected against loss of heat to channels at the ash-pit of the gas-producer, and is injected into the mass of incandescent fuel, as above described. The rest of the heated air is conducted by suitable channels to the throat of the furnace, where it meets and mingles with the hot gas issuing from the producer, causing the flame which operates in the furnace.

The steam which serves to effect the injection of the air, and which also aids chemically in effecting the decomposition of the fuel, may be generated in a boiler heated by the products of combustion from the furnace. A convenient arrangement for this purpose consists in a small tubular boiler placed in a chamber traversed by the products of combustion, the heat of which suffices for the double purpose of generating the steam required for the gas-producer and of heating the air-supply for both the gas-producer and the furnace. A reciprocative action is thus set up between the furnace and the gas-producer, which results in complete utilization of heat, and consequently in great economy of fuel.

The steam-boiler above referred to, having for its sole duty to supply the steam-jet for the producer, may be made of very simple construction, as only moderate pressure is required. Water may be supplied to the lower ends of the tubes from an elevated feeding-cistern without the intervention of valves or feeding apparatus. The steam-outlet from the upper ends of the tubes to the steam jet or jets is left open always, except when the furnace is not in action and the generation of steam ceases. In that case the water from the supply-cistern would completely fill the boiler and overflow through the steam-jets, to prevent which the steam-outlet is provided with a valve, worked by a float in a chamber or steam-chest at the upper extremity of the boiler, so that it is closed when the water rises in the chamber, but is reopened when steam is again formed and takes the place of the water in the steam-chest. If, on the other hand, steam is formed more rapidly than it can be discharged through the steam-jets at the pressure limited by the height of the supply-reservoir, the water will be pressed back and the steam-generating surface will be diminished until an equilibrium between the production and consumption of steam is again established. The upper portion of the tubular surfaces will serve to superheat the steam, but will not be overheated, because the boiler may be so placed that the spent flame from the furnace does not impinge directly upon its surfaces which are surrounded only by heated gases, the supply of which to the boiler may be regulated by suitable valves or dampers. The contents of the boiler being thus always free to escape at both extremities, and the pressure being limited to that due to the height of the supply-reservoir, no safety-valve, pressure-gage, or water-gage is necessary. The quantity of water contained in the boiler is, moreover, so small and so divided that if a tube should give way no destructive action on surrounding objects can take place.

Figure 2:
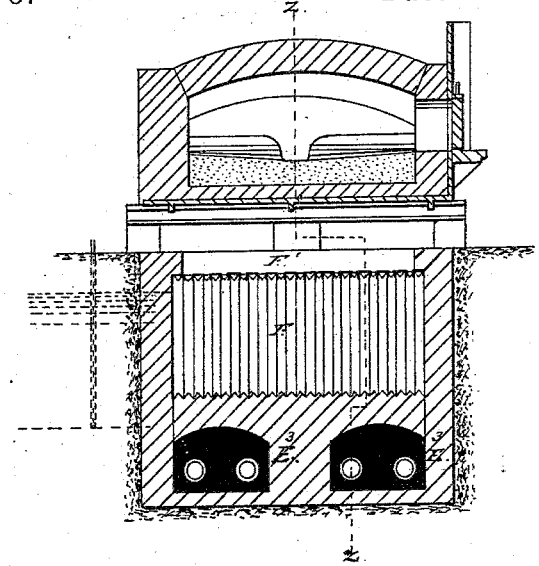
Figure 3:
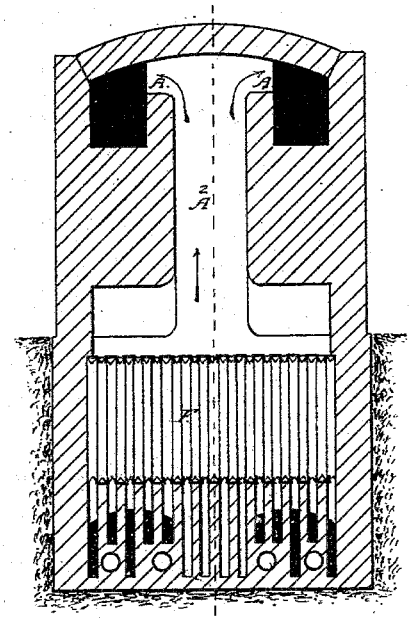
Figure 8:
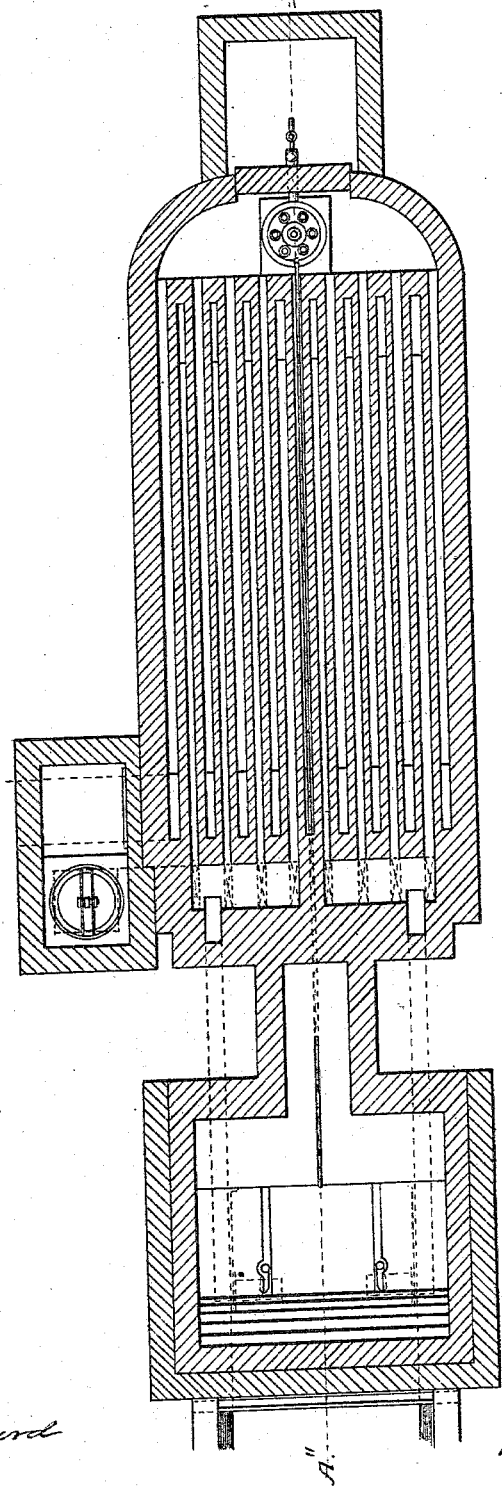
Figure 9:
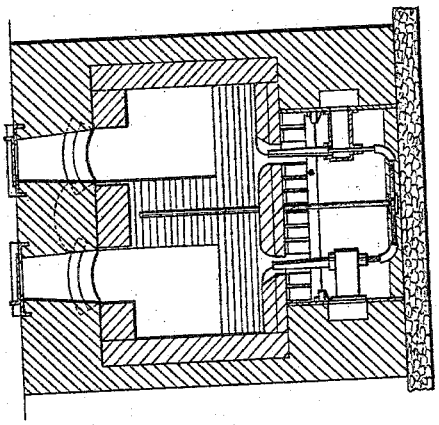

Figure 1 is a longitudinal section on the line Z Z of Fig. 2 of a combined gas-producer and regenerative furnace according to my invention. Fig. 2 is a transverse section on the line Y Y of Fig. 1. Fig. 3 is a transverse section on the line X X, Fig. 1. Fig. 4 is a sectional plan on the line W W, Fig. 1. Fig. 5 is a vertical section of a modified arrangement of the producer, and Fig. 6 is a vertical section of a steam-boiler, arranged as above described, for producing the steam-jet which causes the inflow of air into the producer. Fig. 7 is a longitudinal vertical section on the line A″ B″ of Fig. 8 of a combined gas-producer and regenerative furnace, illustrating the boiler in position. Fig. 8 is a horizontal section on the line E″ F″ G″ H″ of Fig. 7. Fig. 9 is a section on the line I″ K″ of Fig. 7.

The producer A is of conical form in its lower part, and is gathered in above its middle, as shown. It has at the bottom an opening, under which is placed a dish, B, to receive the cinder, which may be cooled by water supplied to the dish by a pipe with stopcock $b$, or a water-trough may surround the opening, as shown in Fig. 5. In the center of the producer is the air-supply pipe C, which may extend upward from the bottom, as shown in Fig. 1, or extend downward from the top, as shown in Fig. 5, its end being protected by refractory material C′. The pipe C itself should be of highly-refractory material or metal—such as cast-steel. The fuel is supplied to the producer by a hopper, D, which has removable covers. The gas produced in A passes by numerous lateral channels $a$ to the flue A′ leading to the furnace-chamber E, where it meets and burns with heated air rising through the shaft $A^2$ from the regenerator below, the flame entering the furnace E by the throat $A^3$, and heating down upon its bed. The flame and products of combustion issue from the furnace by lateral openings E′, leading by vertical channels $E^2$ down to the flues $E^3$, and thence they pass, as indicated by the arrows $e$, along the alternate narrow spaces between brick partitions or vertical plates F to the chimney. Air from under the furnace-bed, entering at F′ the other alternate spaces between the brick partitions or plates F, passes, as indicated by the arrows $f$, to the shaft $A^2$, becoming heated in its passage by conduction of heat through the brick partitions or plates F. Air-pipes $C^2$ pass along the flues $E^3$, so that the air passing through them to supply the air-pipe C of the producer becomes heated in its passage.

According to the arrangement shown in Fig. 1, the hot air under pressure from the pipe $C^2$ issues in a jet in the center of the pipe C, drawing in around it an additional quantity of air, which also becomes heated as it rises up the pipe C, which may be made with internal fins to present additional heating-surface to the passing air, and to aid in cooling the pipe C itself, as well as to strengthen it; or the air may be led directly down by a single pipe into the middle of the producer, as shown in Fig. 5. The current of air to supply the producer may be produced or accelerated by the injector action of a steam-jet, G, as shown in Fig. 5, this jet being supplied from the boiler shown in Fig. 6, which is heated by the products of combustion from the furnace. The steam which aids chemically in effecting the decomposition of the fuel, and serves to effect the injection of the air into the producer, is generated in the boiler shown in Figs. 6, 7, and 8, and is placed, as shown, in a flue or chamber, K, traversed by the products of combustion. The heat of the products of combustion passing through the flue is thus made to generate the steam required for the gas-producer and to heat the air-supply for both the gas-producer and the furnace.

This boiler consists of an upper vessel, H, constituting a steam-chest, and a lower vessel, H′, connected to H by a vertical tube, $H^2$, or several such tubes. The bottom of the boiler is connected by a pipe, $h$, with a water-cistern, $H^3$, situated at sufficient height to give by the water-column the pressure required to the steam generated. The boiler is situated in the furnace-shaft. When steam is generated in excess, the water is forced down the tube or tubes $H^2$, so that a less quantity is exposed to the heat, and when, on the other hand, the steam-pressure decreases, the water rises higher in the boiler tube or tubes, exposing a larger amount to the action of the heat. To prevent water from ascending into the steam-pipe $g$ when there is not sufficient steam-pressure to keep it down, a float-ball, $h'$, is provided in the steam-chest, which, when buoyed up by the water, closes the mouth of the steam-pipe.

In the English Letters Patent No. 972 of 1863, granted to Frederick Siemens and myself on the 18th day of April, A. D. 1863, a method was described of increasing the production and intensifying the heat of the carbonic oxide by supplying to the producer a regulated continuous current of highly-heated air. A method was also described in the said patent of intensifying the heat of the carbonic oxide by limiting the traverse of a continuous current of air and gas produced to a portion of the gas-producer defined by the inlet and outlet of the gas.

I am aware that Letters Patent of Great Britain No. 2,861, dated the 2d day of December, A. D. 1856, were granted to Frederick Siemens for a furnace with a series of passages for the entrance of continuous currents of air or gases for maintaining combustion, which currents were heated by the products of combustion passing in the opposite direction through another series of passages, and divided from them by thin walls or partitions, through which the heat was transmitted.

Having thus described my invention, I claim and desire to secure by Letters Patent—

1. In a regenerative gas-furnace, the combination of a gas-producer, a metal working or heating chamber, a double series of narrow passages arranged beneath the bed of the furnace and separated from each other by brick walls or metal plates, a boiler located in the smoke-flue of the furnace, and a steam-pipe connecting said steam-boiler and gas-producer, as and for the purposes described.

2. The combination of a gas-producer and a metal working or heating chamber, the furnace-chamber having beneath its bed an open air-space, the passages traversed by the air which communicates with the open air-space, the passages traversed by the products of combustion in a direction opposite to that traversed by the air, and connecting-flues, as and for the purposes described.

3. In a regenerative gas-furnace, the combination of a double series of narrow passages arranged beneath the bed of the furnace, a boiler located in the flue connecting said furnace with the narrow passages, and the gas-producer provided with an air-injector, a steam-pipe connecting the boiler and gas-producer, and an air-pipe for the gas-producer, located in the walls of the smoke-flue of the furnace, as and for the purposes described.

4. The combination of the furnace-chamber E, having beneath its bed an open-air space, the vertical channels $E^2$, the flues $E^3$, the vertical plates F, the gas-producer, and the air-pipes $C^2$, all combined, as and for the purposes described.

C. W. SIEMENS.

Witnesses:
E. F. BAMBER,
G. W. TURNER.